INVENTORS
Everett W. Farmer
Richard D. J. Proctor

United States Patent Office 3,283,348
Patented Nov. 8, 1966

3,283,348
HIGH STRENGTH PRESTRESSED SPHERICAL
SONOBUOY
Everett W. Farmer, Reeds Ferry, and Richard D. J. Proctor, Nashua, N.H., assignors to Sanders Associates, Inc., Nashua, N.H., a corporation of Delaware
Filed Mar. 26, 1964, Ser. No. 354,946
6 Claims. (Cl. 9—8)

This invention relates to a new high strength air launched circumferentially prestressed spherical sonobuoy.

More specifically, this invention relates to a sphere shaped sonobuoy which is to be launched from great altitudes and high speeds into the ocean for purposes of obtaining information about the ocean floor and/or the presence of submerged noise producing objects such as submarines. The continued and expanding use of the oceans of the earth has brought about the need to quickly ascertain the presence of foreign objects submerged beneath the sea. This need has brought into use high speed, high altitude aircrafts capable of patrolling large areas of the ocean. When these high speed aircrafts launch electronic gear from such altitudes and speeds, the resulting water impact produces tremendous shock forces on the electronic gear and the housings that hold the electronics. The capacity to withstand shock loadings of great magnitude coupled with the increasing need for miniaturization requires that the electronic gear be packaged in the minimum of space. The ability to provide an electronic package that can be launched at great altitudes and occupy the minimum of space has been accomplished by the invention to be described hereafter.

The present invention takes the form of a small spherical ball configured electronic package less than five inches in diameter which has a unique arrangement of bands, one of which is mounted on the sphere shaped sonobuoy after the buoy has been shrunk in diameter by cooling to very low levels. Accordingly, when the sphere shaped buoy expands, the last mentioned band effectively prestresses the sphere and thereby provides an ultimate electronic package that can be launched from any altitude by an aircraft and yet withstand the impact with the ocean's surface while retaining its total structural integrity intact. Because the buoy's diameter is very small, the use of high strength metals is prohibited because the resulting weight of the buoy would be such that it could not buoyantly support itself. Therefore, the use of light, high strength plastics is required.

It is therefore an object of this invention to provide an air launched sonobuoy capable of withstanding extremely high shock loading which occurs at water impact.

Another object of this invention is to provide an extremely compact sphere shaped sonobuoy within which electronic gear is stored and which electronic gear is retained undamaged as a result of a novel prestressing of the sonobuoy's sphere shaped shell.

Another object of this invention is to provide a high impact strength sonobuoy by utilizing a unique method of preloading two hemispherical shells at the point at which the hemispheres are joined to form a sphere.

For a better understanding of the present invention together with other and further objects thereof, reference is made to the accompanying drawings and its scope will be pointed out in the appended claims.

Figures 1, 1A:
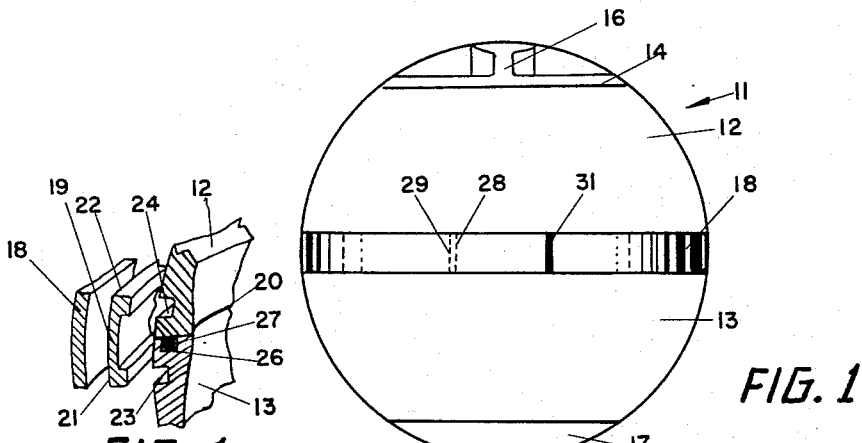
FIG. 1 is an illustration of a sphere shaped sonobuoy embodying the invention.
FIG. 1a is a partial section showing the structural coaction of the prestressing rims.

Reference is now made to FIG. 1, in which there is illustrated a sphere shaped sonobuoy 11 embodying the invention. This sphere shaped sonobuoy is comprised of an upper shell 12 and a lower shell 13. The manner in which the upper shell 12 and the lower shell 13 are secured together may best be understood by a review of the partial section shown in FIG. 1a. FIG. 1a will be described more fully hereafter.

At the center of the sphere shaped buoy 11 is a plain band outer rim 18. Its cooperation with the buoy's upper shell 12 and lower shell 13 will be described hereafter. At an upper portion of the upper shell 12, there is a stabilizing cap 14 which has thereon stabilizing ribs 16, one such rib being clearly shown in FIG. 1. The function of this cap is to provide stability when the buoy, after being launched from a high speed aircraft, strikes the water and starts a partial descent beneath the ocean's surface. As the water flows in and about the surface of the sphere shaped buoy 11, the coaction of the water with the ribs 16 of the stabilizing cap 14 causes the sphere shaped buoy 11 to assume an attitude which points the bottom shell 13 towards the ocean's floor, which is of course the direction of travel of the buoy through the water. Affixed on the lower shell 13 is a bottom release cap 17 which has been designed to release upon water impact only when the buoy is at an attitude which will permit the contents of the buoy to pass outwardly of the buoy and downwardly into the ocean's depths. The manner in which this release cap functions forms no part of the present invention and accordingly, a detailed description of the manner in which it functions will not be made at this time.

Reference is now made to FIG. 1a, where a portion of the upper shell 12 has been depicted in partial section. The upper shell 12 meets the lower shell 13 at a shell junction 20. The lower shell 13 has about its entire circumference a lower shell O-ring groove 26 which has mounted therein a flexible O-ring seal 27 whose function is to aid in the water tight sealing of the two hemispherical upper and lower shells 12 and 13. Immediately adjacent to the junction 20, there is an upper shell lip groove 24 which extends entirely around the upper shell 12. Immediately below the shell junction 20, there is a similar lower shell lip groove 23 which, in a similar manner, extends entirely around the lower shell 13. Shown separated from the upper and lower shells and to the left as depicted in FIG. 1a is a U-shaped inner rim 19 which has an upper shell engaging lip 22 and a lower shell engaging lip 21. The upper shell engaging lip 22 and lower shell engaging lip 21 will be inserted in the grooves 24 and 23, respectively, of the upper shell 12 and the lower shell 13 when the entire sphere shaped buoy 11 has been assembled. The U-shaped inner rim 19, prior to assembly, has a portion thereof which has been cut through. In other words, the U-shaped inner rim 19 has a break or split therein and this break has a critical dimension, the function of which will be explained more fully hereafter. This break in the inner rim 19 is illustrated schematically in FIG. 1 where it is shown as abutting faces 28 and 29 of the inner rim 19.

While FIG. 1 illustrates the presence of a small gap, in actual practice the distance between faces 28 and 29 of the inner rim 19 is non-existent in the finished product, but has been illustrated here as spaced apart to facilitate an understanding of the invention to be described.

Referring once again to FIG. 1a, there is also seen to the extreme left of the FIG. 1a a plain outer rim band 18. This plain outer rim band is a solid continuous hoop shaped rim which, as can be seen in FIG. 1, has a weld joint 31. The dimensions of this outer rim 18 are critical to the ultimate operation of the invention. Before a detailed description is undertaken of the manner in which the outer band 18 and the inner U-shaped rim 19 are placed on the buoy 11, a review of the dynamic forces present on the buoy will be undertaken.

Figure 2:
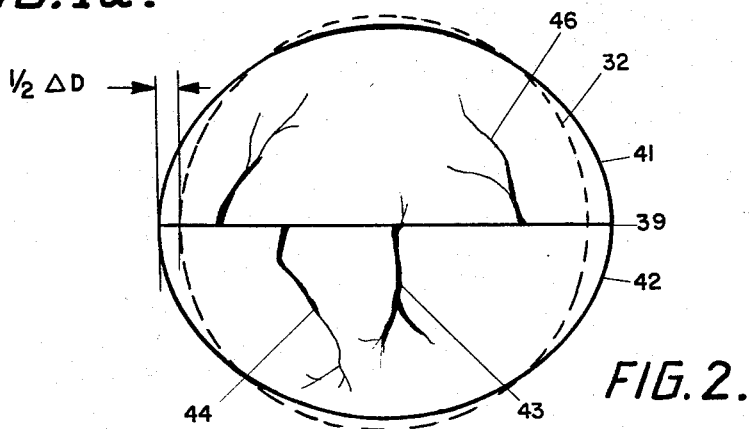
FIG. 2 is a schematic representation of a sphere shaped buoy not embodying the invention and its deformation upon water impact.

Referring now to FIG. 2, there is presented a schematic illustration of an outline of a sphere shaped buoy that has undergone impact loading at water contact. There is shown as a dotted line 32, a phantom outline of a normal sphere shaped buoy configuration without any distortion. When a buoy with this spherical configuration has been made up of two hemispherical shells such as that depicted in FIG. 1, the most critical attitude at which this buoy can enter the ocean, taken from a standpoint of impact loading, occurs when the center line where the shells join, which forms a plane, is parallel to the point of impact with the ocean.

In the past, sphere shaped sonobuoys of the type being described herein that were launched from low altitudes and slow speed aircrafts could withstand the shock of striking the ocean's surface without fracturing. As pointed out above, high speeds and the greater altitudes have brought forces on the sonobuoys of tremendous magnitudes.

FIG. 2 illustrates schematically a sphere shaped sonobuoy having a distorted upper shell 41 and a distorted lower shell 42 bonded together at 39 by a suitable cement such as epoxy. While this type of joint was sufficient for low impact loadings, it can be seen that when a buoy enters the water at the critical attitude noted above, there is for an infinitesimal fraction of a second, a distortion of the sphere shaped buoy of the type shown in FIG. 2; namely, the sphere tends to flatten itself into an ellipsoidal configuration which brings about an enlargement of the phantom sphere shape 32 to that denoted by the solid lines make up of a distorted upper shell 41 and distorted lower shell 42. This drawing has been purposely exaggeratedly distorted for purposes of conveying the reason why the sonobuoys of prior constructions would shatter on impact. When the overall diameter of the buoy has increased in size as shown to the left of FIG. 2 by the designated $\Delta D$, this total expansion of $\Delta D$ exceeds the elastic limits which the buoy can withstand especially at the epoxy junction line 39. When the buoy exceeds in expansion the tensile capability of the materials, there appear the sudden rupture fractures 43, 44, and 46 which result in either the entire buoy shattering or presenting cracks on the surface which permit the entrance of moisture from the ocean, which destroys the electronic components housed within.

The placing of the inner U-shaped rim 19 and the outer rim 18 on the buoy is critical to the successful survival of the buoy when there has been high impact loading when the buoy enters the water at a critical attitude. The inner U-shaped rim 19 has a split, as noted above, and is maintained prior to assembly at room temperature as is the solid outer rim 18. The entire sphere shaped buoy 11 is then reduced in temperature to an extremely low state, for example −55° C., which results in the total shrinking in diameter of the entire sphere shaped buoy. Once the buoy has been lowered in temperature and thereby shrunk, the split U-shaped inner rim 19 is placed around the center of the buoy and the lower shell engaging lip 21 and upper shell engaging lip 22 are mated with the lower shell lip groove 23 and upper shell lip groove 24 and the split portion with abutting portions 28 and 29 are brought into contact. It should be noted that the inner rim 19 may also be lowered in temperature along with the upper and lower shells 12 and 13. The outer rim 18, which is also at room temperature as is the U-shaped rim 19, is placed about the mid section of the sphere shaped buoy 11 in the position illustrated in FIG. 1a. The entire buoy is then allowed to rise to room temperature. Because the diameter selected for the outer rim 18 is slightly smaller than the combined diameters made up of the sphere shaped buoy 11 at room temperature and the thickness of the inner U-shaped rim 19, the diameter of the sphere shaped buoy 11 will not be able to expand upon return to room temperature to its original diameter. This will result in a prestressing of the joint established by the junction formed by the upper shell 12 and the lower shell 13. It is therefore seen that the original diameter of the sphere shaped buoy 11 before the insertion of the inner U-shaped band 19 and the outer rim 18, has been reduced as a result of prestressing.

Accordingly, when the sonobuoy, with a band arrangement described above and illustrated schematically in FIG. 3, strikes the water at the critical attitude, the critical central region of the buoy which is housed beneath the band 18 will attempt to expand in the manner illustrated in FIG. 2; but in order to accomplish this, the shock transmitted to the central region due to the shock loading experienced upon water impact at the junction of upper and lower shells 12 and 13, respectively, must overcome the compressive loading presented by the presence of the prestressing outer rim 18. Once this has been overcome and before there can be a possible fracture to the buoy, the tensile strength of the band, which in this case is made of steel, must also be overcome.

As set forth above, this shock loading is only present for a minute instant at the time of water impact and therefore the prestressing of the central region of the buoy 11 results in an overall structure highly resistant to the possibility of fracture due to sudden shock loadings which are associated with high velocity water impact.

Figure 3:
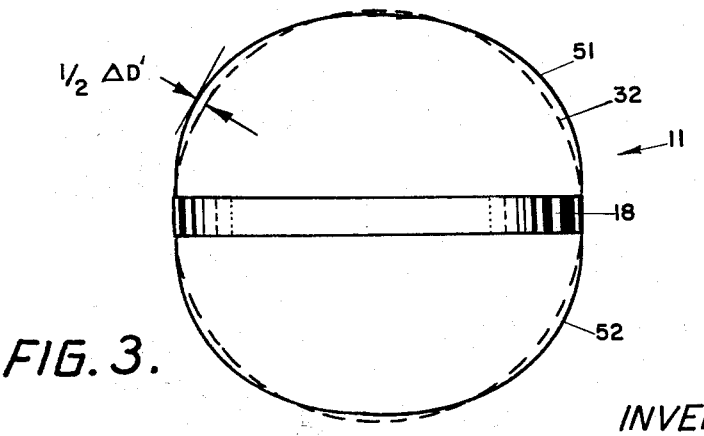
FIG. 3 depicts a sonobuoy embodying the invention and its deformation upon water impact.

FIG. 3 sets forth, in an exaggerated form, the configuration assumed by the sphere shaped buoy 11 at water impact. There is seen illustrated in FIG. 3 an outer rim controlled upper shell distortion 51 and a rim controlled lower shell distortion 52. It can also be seen that the $\Delta D'$ here pointed out as $\frac{1}{2} \Delta D'$ is significantly less than the $\frac{1}{2} \Delta D$ shown in FIG. 2. This $\frac{1}{2} \Delta D'$ is of a dimension which is less than the elastic limit of the materials used for the upper shell. It is also important to note that the maximum distortion that occurs, as designated at 51 and 52, occurs in a region of the sphere shaped buoy's surface where there is no seam thereby further enhancing the buoy's capability of withstanding tremendous water impact shock loadings.

While the reduction in diameter of the hemispherical shells 12 and 13 may be accomplished by cooling, there is another technique available. The outer rim 18 may be pressed downwardly around the inner rim 19 in a press fit to thereby accomplish the prestress of the junction formed by the upper and lower shells 12 and 13.

While there has been hereinbefore described what are at present considered preferred embodiments of the invention, it will be apparent that many and various changes and modifications may be made with respect to the embodiment illustrated, without departing from the spirit of the invention. It will be understood that all changes and modifications as fall fairly within the scope of the present invention, as defined in the appended claims, are to be considered as part of the present invention.

What is claimed is:

1. An air-launched spherical sonobuoy capable of withstanding high water impact forces comprised of
   (A) a pair of mating substantially hemispherical shells having a mating junction and having fastening means to hold said hemispheres together to form a sphere-shaped sonobuoy,
   (B) said fastening means having the form of a pair of cylindrical rims mounted one within the other and surrounding said hemispheres at a point where said hemispheres meet,
   (C) each of said hemispherical shells having a circumferential groove parallel to a plane containing said mating junction, (D) the inner cylindrical rim having inwardly projecting retaining lips in mating contact with said hemispherical shell's circumferential grooves, and (E) said fastening means serving to prestress said spherical sonobuoy.

2. The combination set forth in claim 1, wherein said hemispherical shells are fabricated from plastic.

3. The combination set forth in claim 1 wherein the outer cylindrical rim which surrounds said inner rim has an inner diameter which is less than said inner rim's outer diameter to thereby establish a constant preloading to said mating junction at which said hemispheres meet, thereby circumferentially prestressing said spherical sonobuoy.

4. The combination set forth in claim 1 wherein said inner rim has a split in a portion thereof to thereby allow for the manual insertion of said inner rim around said mating junction.

5. The combination set forth in claim 1 wherein the outer cylindrical rim is of a continuous and solid material.

6. An air launched circumferentially prestressed spherical sonobuoy capable of withstanding high water impact forces comprised of:

(A) a pair of substantially hemispherical shells having a mating junction and having fastening means to hold said hemispheres together to form a sphere shaped sonobuoy, (B) each of said hemispheres having a circumferential groove parallel to a plane containing said mating junction, (C) said fastening means having the form of a pair of cylindrical rims mounted one within the other, (D) the inner rim of said pair of cylindrical rims having inwardly projecting retaining lips in mating connection with each of said hemispherical shell's circumferential grooves, (E) said inner rim having a split therein to allow for the insertion of said inner rim's retaining lips into said circumferential grooves, (F) said cylindrical rim which surrounds said inner rim having an inner diameter which is less than the external diameter of said split inner rim when said inner rim is in position around said hemisphere's mating junction to thereby compressively prestress said hemispherical mating, whereby said mating junction upon water impact has any expansion distortion to the mating junction controlled by said cylindrical rim's prestressing.

References Cited by the Examiner

UNITED STATES PATENTS

| | | | |
|---|---|---|---|
| 846,567 | 3/1907 | Hill | 9—8 |
| 1,492,415 | 4/1924 | Bell | 220—5 X |
| 2,451,089 | 10/1948 | Hunter | 220—5 |
| 2,679,948 | 6/1954 | Deardorff | 220—71 |

MILTON BUCHLER, *Primary Examiner.*

FERGUS S. MIDDLETON, *Examiner.*

T. MAJOR, *Assistant Examiner.*